(12) United States Patent
Krotkov et al.

(10) Patent No.: US 9,742,684 B1
(45) Date of Patent: Aug. 22, 2017

(54) ADAPTIVE SERVICE SCALING

(71) Applicant: Amazon Technologies, Inc., Reno, NV (US)

(72) Inventors: Andrei N. Krotkov, Seattle, WA (US); Zachary G. Fewtrell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1093 days.

(21) Appl. No.: 13/666,540

(22) Filed: Nov. 1, 2012

(51) Int. Cl.
*G06F 15/173* (2006.01)
*H04L 12/911* (2013.01)

(52) U.S. Cl.
CPC ................... *H04L 47/70* (2013.01)

(58) Field of Classification Search
CPC ....... H04L 47/70; H04L 47/25; H04L 47/781; H04L 47/783; H04L 67/10; H04L 67/1014; H04L 63/10; H04L 41/50; H04L 41/5058; H04L 43/0817; G06F 11/3443; G06Q 10/06; G06Q 10/0631; H04W 4/001; Y02B 60/142
USPC .......... 709/223–226, 229; 726/1, 15
See application file for complete search history.

(56) References Cited

U.S. PATENT DOCUMENTS

| | | | |
|---|---|---|---|
| 8,417,814 B1* | 4/2013 | Hartmann | ............. 709/225 |
| 2005/0240668 A1* | 10/2005 | Rolia | ........... H04L 67/325 709/223 |
| 2005/0268299 A1* | 12/2005 | Picinich | ............. G06F 9/485 718/100 |
| 2012/0265881 A1* | 10/2012 | Chen | ............. H04L 12/12 709/226 |
| 2013/0042008 A1* | 2/2013 | Das | ........... G06F 17/30896 709/226 |
| 2013/0097601 A1* | 4/2013 | Podvratnik | ........ G06F 9/5027 718/1 |

* cited by examiner

*Primary Examiner* — Ryan Jakovac
*Assistant Examiner* — Da T Ton
(74) *Attorney, Agent, or Firm* — Thomas Horstemeyer, LLP

(57) ABSTRACT

Disclosed are various embodiments for a service scaling application. Requests for predicted future usage of a service are obtained. Resources required to satisfy the requests are calculated and aggregated. Growth functions facilitate determining usage of a service over time. An acquisition of resources is then generated from the required resources.

20 Claims, 4 Drawing Sheets

ADAPTIVE SERVICE SCALING

BACKGROUND

Resources allocated for executed services must adapt over time to account for fluctuating service usage. Predicting the amount of required resources complicates resource acquisition.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Service-oriented architectures allow for scalable and adaptable integration of service functionality. As additional applications, products, and functionality are created by clients who use the executed services, the resources required for the services increases. Resource requirements will also fluctuate over time, necessitating an adaptation to the allocated resources. Manual estimates of required resources are error prone and not always responsive to changes in service usage over time. Furthermore, drastic changes in service usage due to product launches or new versions of applications need to be accounted for to minimize the impact of users and clients.

A service scaling application allows clients of the services to submit requests for future use of a service. The resources required to satisfy the request can be calculated using estimated transactions per second. Service owners can define allocation functions to translate the transactions per second into hardware requirements. Clients can also define growth functions to account for how service usage will change over time. If a product launch or other milestone anticipates a significant change in service usage, a start date can be defined to better prepare the required resources. Growth functions can also be used to automatically generate future requests. After aggregating the resource requirements for the received requests, the service scaling application can determine the amount of additional resources required for the service.

In the following discussion, a general description of the system and its components is provided, followed by a discussion of the operation of the same.

Figure 1:
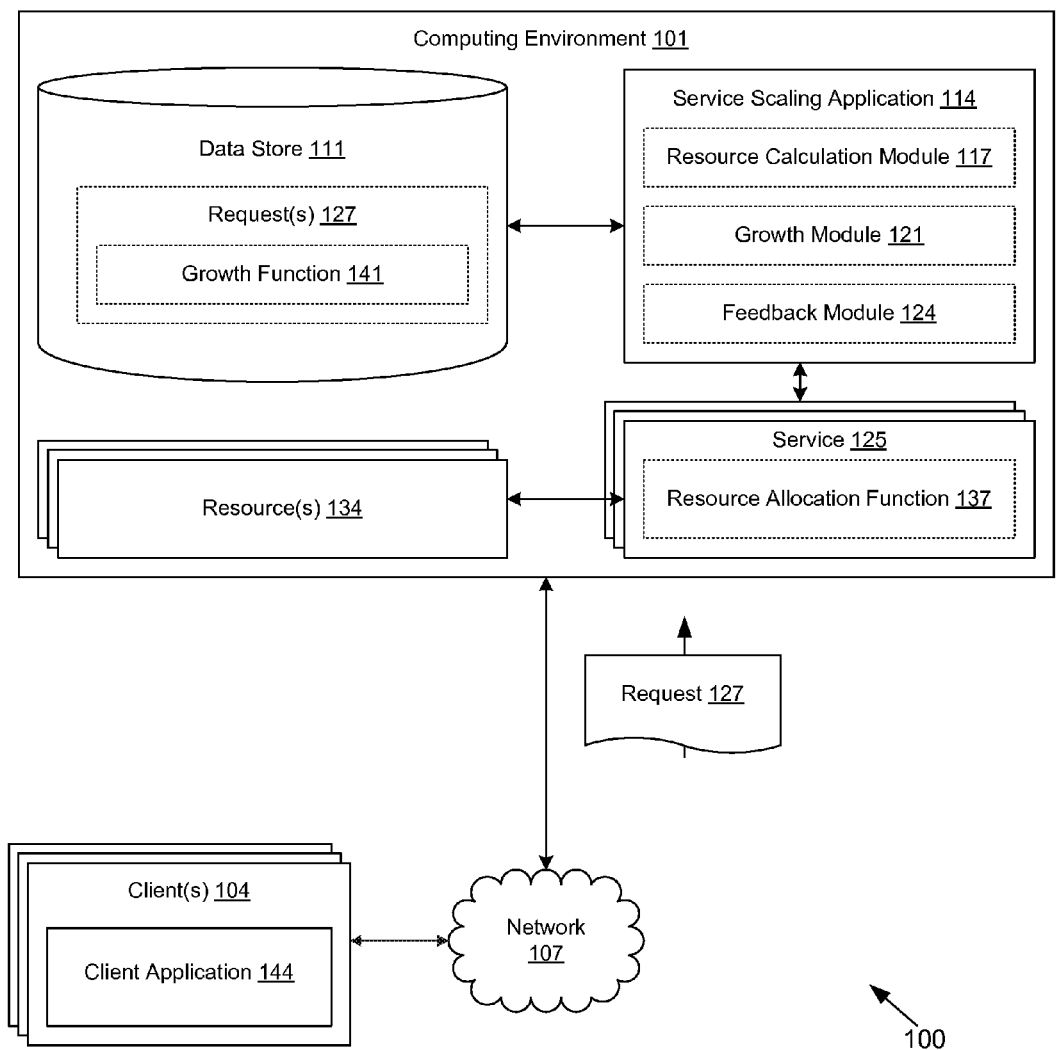
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include service scaling application 114 having a resource calculation module 117, growth module 121, and feedback module 124. The components also include services 125 and other applications, services, processes, systems, engines, or functionality not discussed in detail herein. The service scaling application 114 is executed to obtain requests 127 from clients 104 relating to a predicted use of a service 125 with respect to a future time period.

The resource calculation module 117 is executed to determine an amount of resources 134 required to meet the anticipated use of services 125 embodied by the requests 127. The resource calculation module 117 may base the anticipated resource 134 requirements as a function of a resource allocation function 137 defined with respect to each of the executed services 125. The resource allocation function 137 defines a conversion of service 125 usage to resources 134 required to implement that usage. For example, a resource allocation function 137 may embody a conversion of transactions per second with respect to a hardware load, or another function. A resource 134 acquisition can be calculated as a function of anticipated resource 134 requirements and a pool of available resources 134 or other data.

The growth module 121 is executed to automatically generate additional requests 127 over time. The automatically generated requests 127 may be based on an initial request 127 obtained from a client 104 and a growth function 141 embodying a predicted trend for service 125 usage. The growth module 121 may also determine whether a predicted service 125 usage diverges from an actual service 125 usage in order to facilitate future allocation of resources 134.

The feedback module 124 generates reports for a client 104 detailing their actual service 125 usage and their predicted service 125 usage. In conjunction with the growth module 121, the feedback module 124 may communicate to a client 104 an opportunity to revise an existing request 127 or submit a new request 127 if the actual and predicted service 125 diverge. Other criteria may also trigger communicating an opportunity to revise an existing or create a new request 127. Additionally, the feedback module 124 facilitates the approval or denial of requests 127 by an owner or administrator of the associated service 125, or another entity.

Services 125 are executed to facilitate the operation of various applications and functionality associated with clients 104. For example, a client 104 may be associated with a web site or web application executed in the computing environment 101 which requires the use of at least one service 125 to perform its functionality or serve its content.

Resources 134 comprise logical, physical, or computational components which facilitate the operation and execution of services 125. Resources 134 may comprise, for example, servers, processing modules, hard disks, networking components, or other physical devices. Resources 134 may also comprise virtual machines, bandwidth, network capacity, processing ability, or other logical concepts relating to the execution of services 125. Resources 134 may also comprise other components, as well.

The data stored in the data store 111 includes, for example, resources 134, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 144 and/or other applications. The client application 144 may be executed in a client 104 for example, to access network content served up by the computing environment 101 and/or other servers. The client application 144 may, for example, comprise a browser, a mobile application, etc. The client 104 may be configured to execute applications beyond the client application 144 such as, for example, browsers, mobile applications, email applications, social networking applications, and/or other applications.

The client 104 communicates requests 127 to the computing environment. Communicating the requests 127 may be facilitated by the client application 144 or another application. The request 127 comprises various data to facilitate an estimation of resources 134 required to satisfy the request. A request 127 may comprise one or more estimated transactions per second with respect to the corresponding service 125. For example, the request 127 may indicate that a newly launching application will call the service fifty times per second. The estimated transactions per second may be with respect to future time period. For example, the request 127 may comprise an estimated fifty transactions per second for the next month, and sixty transactions per second for the subsequent month. The estimated transactions per second may also be a function of other data.

The request 127 may also comprise a start date. The start date represents a point in time from which the requested service usage will begin. The start date may be used to designate a launch of a product or application, or for another purpose. For example, the requested service 125 usage may begin at a predefined date, such as December 25, or a date determined as a function of other information, such as two weeks from acceptance of the request 127. Additionally, the start date may be undefined, in which the requested service 125 usage may begin as a function of a default or predefined value. Start dates may be determined by other approaches, as well.

Requests 127 may also comprise a growth function 141. The growth function 141 embodies a predicted trend of service 125 usage over a period of time. The growth function 141 may comprise multiple predefined values of transactions per second, each value corresponding to a different time period. For example, the growth function 141 may comprise ten transactions per second for a first month, twelve transactions per second for a second month, eighteen transactions per second for a third month, and nineteen transactions per second for a fourth month.

Growth functions 141 may also comprise an arithmetic, multiplicative, exponential, or other function repeatedly applied to the current estimated transactions per second at a predefined time interval. For example, the growth function 141 may comprise a ten percent increase in transactions per second each month. Other functions may also be used in the growth function 141 to embody a trend in future service 125 usage.

Next, a general description of the operation of the various components of the networked environment 100 is provided. To begin, services 125 are executed in the computing environment 101 facilitated by resources 134. In some embodiments, resources 134 comprise a subset of unused or unallocated resources 134. Resources 134 may also be used to facilitate the operation of other components of the computing environment 101.

Next, the service scaling application 114 obtains requests relating to anticipated future use of a corresponding service 125 by some application or functionality associated with a client 104. For example, the request 127 may comprise the use of a service 125 in a newly launching web application associated with the client 104. In some embodiments the requests 127 are obtained from the network 107 after being communicated to the computing environment 101 by a client 104. Communicating the request 127 may be facilitated by the client application 144 or another application. Also, the service scaling application 114 may facilitate obtaining the request 127 by serving content or other data to the client 104 or the client application 144.

For example, the service scaling application 114 may serve a network page for rendering by a browser client application 144 which comprises a user interface for generating a request 127. The service scaling application 114 may also expose application program interfaces to be called by a client application 144 to facilitate generating requests 127. The service scaling application 114 can then obtain the generated requests 127 from the network 107. The service scaling application 114 may facilitate obtaining requests 127 by other approaches or techniques.

In another embodiment, the requests 127 are automatically generated by the service scaling application 114 from stored requests 127. The requests 127 may be generated at a predefined interval, in response to a user input, or in response to some other event or condition. For example, the service scaling application 114 may generate a new request 127 from an initial request 127 embodying a greater predicted service 125 usage determined by the growth function 141 of the initial request. Requests 127 may also be automatically generated in response to a divergence between a predicted service 125 use and actual service 125 use trends, requiring a reevaluation of the required resources 134. Other approaches or functions may also be used to automatically generate requests 127.

Next, after obtaining requests 127, the service scaling application 114 generates a resource 134 acquisition to satisfy the needs of the requests 127. The resource 134 acquisition may be with respect to a particular time period. For example, the resource 134 acquisition may comprise the required resources 134 to satisfy the estimated service 125 usage for the next quarter, or another time period.

To generate the resource 134 allocation, the growth module 121 first calculates estimated service 125 use over time for each request. The estimated service 125 use over time embodies the service 125 usage of that request 127 graphed with respect to the future time period of the resource 134 allocation. The estimated service 125 use over time may be a function of an initial estimated transactions per second of the request 127, a growth function 141, and other data.

Next, the resource calculation module 117 determines a resource 134 requirement for each request 127. The resource 134 requirement is an amount of resources 134 necessary to meet the demands of the request 127. In one embodiment, the resource calculation module 117 determines the peak service 125 usage for each request 127 and applying a function to the peak service 125 usage. For example, the required resources 134 for a request 127 may comprise an integration of the estimated service 125 usage over time at the peak usage time, or some other function.

Additionally, calculating a resource 134 requirement for a request 127 may be a function of a resource allocation function 137 defined with respect to the corresponding service 125. For example, a service 125 may define a resource allocation function 137 which designates a ratio of transactions per second with respect to a resource 134 load. This resource allocation function 137 may be implemented in conjunction with a peak usage of the service 125 by the request or other data. Additionally, in some embodiments, the resource calculation module 117 may comprise a default resource allocation function 137 to convert service 125 loads into required resources 134. Other functions and techniques may also be used to convert service 125 loads into required resources 134.

After the resource 134 requirements have been determined for each request 127, the service scaling application 114 aggregates the resource 134 requirements with respect to each service 125. The aggregated resource 134 requirements are the total amount of resources 134 required to satisfy the load on the service 125 by the associated request.

Next, the service scaling application 114 generates a resource 134 acquisition with respect to the service 125. The resource 134 acquisition embodies a number of resources 134 to be integrated into the computing environment 101 to facilitate the predicted service 125 usage associated with the received requests 127. The resource 134 acquisition may comprise a purchase of hardware or devices, an allocation of memory, a creation of virtual machines, upgrading existing hardware, devices, or functionality, or other information. Generating the resource 134 acquisition may be a function of the resource 134 requirements for the at least one of the services 125, or other data.

In some embodiments, the service scaling application 114 has access to a pool of unused or unallocated resources 134. In such embodiments, the resource 134 acquisition may be generated as a function of the unused or unallocated resources 134. For example, a resource 134 acquisition comprising a purchase of five servers may reduce the purchase count by a number of unused servers already available. Other approaches may also be used to generate the resource 134 acquisition.

After the acquired resources 134 have been integrated into the computing environment 101 for the predicted service 125 load, the feedback module 124 may generate reports embodying service 125 and resource 134 usage. The reports may be communicated to clients 104, or used as a basis for other functionality of the service scaling application 114. The reports may comprise information relating to an actual usage of one of the services 125 over time, a predicted usage of one of the services 125 over time based at least in part on the growth function 141, or other data. In some embodiments, the report may comprise an opportunity for a client 104 to update an existing or create a new request 127.

For example, a report may comprise data indicating that a predicted usage of a service 125 by the client 104 diverges from trends of actual usage of the service 125, resulting in unused or unneeded resources 134. The report may solicit the client 104 to modify a growth function 141 in order to better represent their resource 134 requirements, and thereby reduce the cost of acquiring resources 134.

In other embodiments, the service scaling application 114 may automatically modify existing or create new requests 127 where predicted service 125 usage diverges from actual service 125 usage trends. Reports generated by the feedback module may be used in other approaches, as well.

Figure 2:
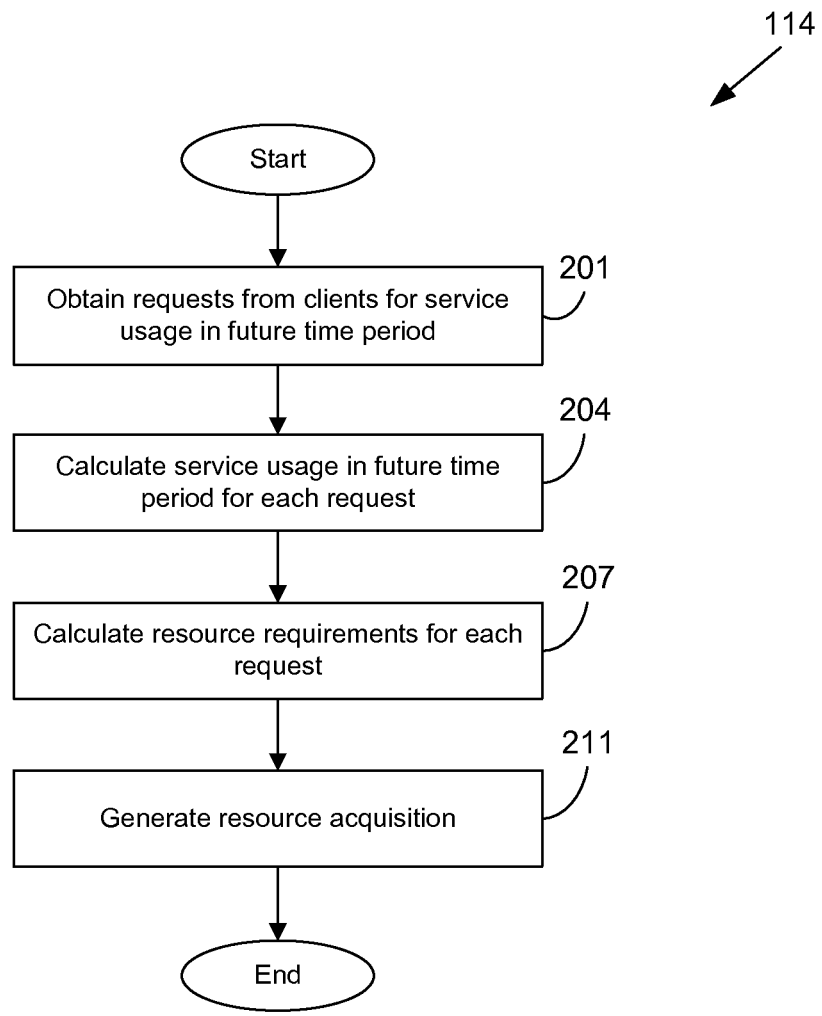
FIG. 2 is a flowchart illustrating one example of functionality implemented as portions of service scaling application executed in a computing environment in the networked environment of FIG. 1 according to various embodiments of the present disclosure.

Referring next to FIG. 2, shown is a flowchart that provides one example of the operation of a portion of the service scaling application 114 (FIG. 1) according to various embodiments. It is understood that the flowchart of FIG. 2 provides merely an example of the many different types of functional arrangements that may be employed to implement the operation of the portion of the service scaling application 114 as described herein. As an alternative, the flowchart of FIG. 2 may be viewed as depicting an example of steps of a method implemented in the computing environment 101 (FIG. 1) according to one or more embodiments.

Beginning with box 201, the service scaling application 114 obtains requests 127 (FIG. 1) from clients 104 (FIG. 1) for a predicted service 125 (FIG. 1) usage in a future time period. The requests 127 may be obtained from a network 107 (FIG. 1) after being communicated to the network by the client 104. Communicating the request 127 may be facilitated by a client application 144 (FIG. 1) or another application or functionality. The requests 127 may also be obtained from the by another approach.

In box 204, the growth module 121 (FIG. 1) of the service scaling application 114 calculates a service 125 usage in the future time period for each of the obtained requests 127. The service 125 usage may be calculated with respect to an initial service 125 usage such as an initial transactions per second, or another metric. The service usage may also be calculated by applying a growth function 141 (FIG. 1) to the initial service 125 usage, the future time period, or other data. Other approaches may also be used to calculate the service 125 usage in the future time period.

In box 207, the resource calculation module 117 (FIG. 1) calculates resource 134 (FIG. 1) requirements for each request 127. Calculating the resource 134 requirements may comprise determining a peak service 125 usage in the future time period for each request 127. The peak service 125 usage may be a function of the service 125 usage over time or other data. Calculating the resource 134 requirements may further comprise calculating an integral at the peak service 125 usage for each request, or calculating some other value. The resource 134 requirements may also be calculated as a function of a resource allocation function 137 (FIG. 1) to translate service 125 usage into resources 134. The resource allocation function 137 may be associated with the service 125. The resource allocation function 137 may also be a default resource allocation function 137 applied to multiple services 125. Other approaches and functions may also be used to calculate the resource 134 requirements.

In box 211 the service scaling application 114 generates a resource 134 acquisition to satisfy the obtained requests 127. Generating the resource 134 acquisition may comprise aggregating the resource 134 requirements associated with the obtained requests. The resource 134 acquisition may also be a function of an already existing pool of resources 134 which may satisfy the entirety of a portion of the resource 134 requirements. Other data may also be used to generate the resource 134 acquisition.

Figure 3:
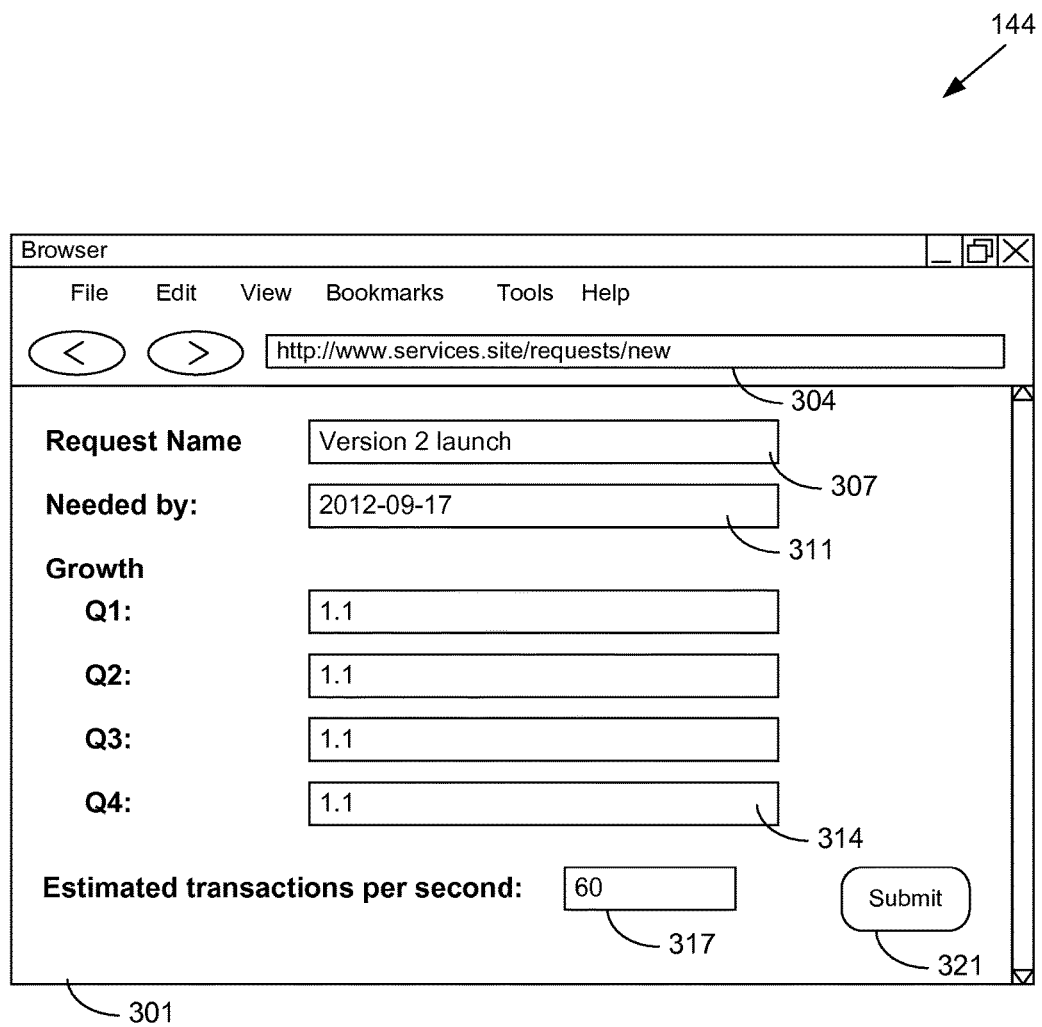
FIG. 3 is a drawing of an example of a user interface rendered by a client in the networked environment of FIG. 1 according to various embodiments of the present disclosure.

Moving on to FIG. 3, shown is a user interface representing a network page served by the service scaling application 114 (FIG. 1) for rendering on a client 104 (FIG. 1) to facilitate the creation of a request 127 (FIG. 1) for communication over the network 107 (FIG. 1). Alternatively, FIG. 3 may also be representative of a user interface created by a dedicated application.

Item 301 represents a client application 144 (FIG. 1) embodying a browser for rendering network pages served by the service scaling application 114. Item 304 represents an address bar for inputting a Uniform Resource Location (URL), Internet Protocol (IP) address, or other identifier to facilitate interactions between the client 104 and the service scaling application 114.

Item 307 represents an input for a unique identifier to be associated with a submitted request 127. The identifier facilitates future retrieval of the request 127 for modification. The identifier also facilitates access of the request 127 by users or administrators of the service scaling application 114 when manual intervention is required to perform some task or address a client 104 issue with a submitted request 127.

Item 311 represents a start date for the predicted service 125 usage associated with the request. The start date is used as a basis for calculating service 125 usage in a future time period using a growth function 141 (FIG. 1) or other data. The start date also is used to establish a milestone or deadline for acquiring the necessary resources 134. Start dates may also be used in other functionality, as well.

Item 314 represents an example input area for a client 104 to input a growth function 141 to be associated with the request 127. In this embodiment, the growth function 141 is divided into multiplicative increases in service 125 usage with respect to quarters of a year. In this embodiment, the predicted service 125 usage would be increased by ten percent of the preceding service 125 usage each quarter. Other formulas or models may also be used in generating growth functions 141 for a request 127.

Item 317 represents an estimated initial transactions per second to be executed with respect to the service 125 associated with the request 127. This value will be used to calculate a predicted service 125 use in the future time period in conjunction with the growth function 141, although other metrics may also be used.

Item 321 initiates a generation of a request 127 based on the inputs into the browser client application 144. The request 127 is communicated to the service scaling application 114 via the network 107 after being generated.

Figure 4:
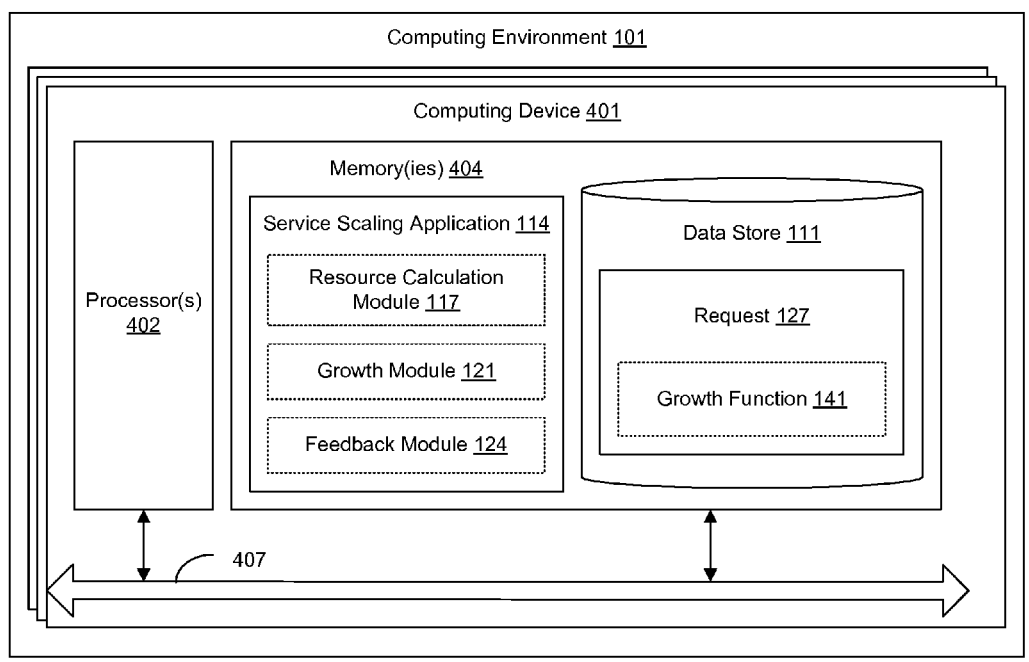
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a service scaling application 114 (FIG. 1) having a resource calculation module 117 (FIG. 1), a growth module 121 (FIG. 1), and a feedback module 124 (FIG. 1), and potentially other applications. Also stored in the memory 404 may be a data store 111 (FIG. 1) storing requests 127 (FIG. 1) having growth functions 141 (FIG. 1) and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the service scaling application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 2 shows the functionality and operation of an implementation of portions of the service scaling application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a service scaling application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed by the at least one computing device, causes the at least one computing device to at least:
   obtain, a plurality of requests, individual ones of the plurality of requests being associated with one of a plurality of clients and relating to a predicted use of a service;
   generate a plurality of resource requirements, individual ones of the plurality of resource requirements corresponding to one of the requests and associated with a time period;
   generate a service usage model as a function of the resource requirements and the time period;
   generate a resource acquisition as a function of a pool of available resources and an integral of the service usage model at a peak usage period;
   calculate a projected usage associated with one of the requests as a function of the associated one of the requests and the time period;
   calculate an actual usage associated with one of the requests;
   generate a report embodying a divergence between the projected usage and the actual usage; and
   wherein the requests comprise a number of transactions per second, a start date, and a growth function, the service is associated with a resource allocation function, and the resource requirements are generated as a function of the corresponding one of the requests and the resource allocation function.

2. The non-transitory computer-readable medium of claim 1, wherein the resource allocation function is defined by an owner associated with the service.

3. The non-transitory computer-readable medium of claim 1, wherein the program further causes the at least one computing device to at least:
communicate the report to one of the clients; and
obtain an updated request from the one of the clients.

4. A system, comprising:
at least one computing device configured to at least:
obtain, from a client, at least one request associated with a service, the at least one request relating to an allocation of resources for a predicted service usage;
generate at least one resource requirement as a function of the request by calculating a time of peak resource usage associated with the service that is predicted to occur within a future time period and an integration of the future time period at the time of peak resource usage; and
generate a resource acquisition based at least in part on the at least one resource requirement.

5. The system of claim 4, wherein the at least one request comprises an estimated transactions per second associated with the service.

6. The system of claim 5, wherein the at least one request further comprises an anticipated growth function associated with the estimated transactions per second.

7. The system of claim 6, wherein the at least one request is a first request, the first request comprises a start date, and the at least one computing device is further configured to at least generate a second request at a predefined interval after the start date as a function of the anticipated growth function.

8. The system of claim 4, wherein the resource acquisition is further based at least in part on a pool of available resources.

9. The system of claim 4, wherein the at least one resource requirement is generated as a function of a resource allocation function predefined with respect to the service.

10. The system of claim 6, wherein the at least one computing device is further configured to at least generate a report embodying the executed transactions per second associated with the service and occurring within a time period.

11. The system of claim 10, wherein the at least one computing device is further configured to at least:
calculate a projected growth occurring in the time period as a function of the anticipated growth function;
calculate an actual growth occurring in the time period as a function of the executed transactions per second;
determine whether a divergence of the projected growth and the actual growth exceeds a threshold; and
obtain, in response to the divergence exceeding the threshold, a response to the divergence from the client.

12. A method, comprising:
obtaining, in a computing device, a plurality of requests, individual ones of the plurality of requests relating to a corresponding resource allocation for a predicted use of one of a plurality of services in a future time period and being associated with at least one client;
calculating, in the computing device, for the plurality of services, a plurality of times of peak resource usages within a future time period, individual ones of the peak resource usages corresponding to a respective one of the plurality of services;
generating, in the computing device, a plurality of resource requirements, individual ones of the resource requirements corresponding to a respective one of the plurality of requests and being based in part on a corresponding one of the plurality of times of peak resource usages; and
generating, in the computing device, at least one resource acquisition as a function of the resource requirements and at least one integration of the future time period at at least one of the plurality of times of peak resource usages.

13. The method of claim 12, wherein the requests comprise a usage start time.

14. The method of claim 12, wherein the requests comprise a growth function, and the resource requirements are generated as a function of the growth function of the corresponding one of the requests.

15. The method of claim 14, wherein the requests comprise a corresponding usage start time, and the method further comprises:
generating at least one additional request at a predefined interval after the corresponding usage start time of one of the requests; and
wherein the at least one additional request is generated as a function of the growth function of the one of the requests.

16. The method of claim 12, wherein the at least one resource acquisition is further generated as a function of a pool of available resources.

17. The method of claim 12, wherein the services are each associated with one of a plurality of resource allocation functions, and the at least one resource allocation is further generated as a function of the resource allocation functions.

18. The method of claim 12, further comprising generating, in the computing device, a report associated with one of the requests comprising an actual usage of the corresponding one of the services over time.

19. The non-transitory computer-readable medium of claim 1, wherein individual ones of the plurality of requests comprise a usage start time.

20. The non-transitory computer-readable medium of claim 1, wherein the program, when executed by the at least one computing device, causes the at least one computing device to at least send the report to another computing device.

* * * * *